(12) United States Patent
Kuang (10) Patent No.: US 11,666,137 B2
(45) Date of Patent: Jun. 6, 2023

(54) BRUSHHEAD FOR POWER TOOTHBRUSH

(71) Applicant: Juan-Yun Kuang, Shenzhen (CN)

(72) Inventor: Juan-Yun Kuang, Shenzhen (CN)

( * ) Notice: Subject to any disclaimer, the term of this patent is extended or adjusted under 35 U.S.C. 154(b) by 0 days.

(21) Appl. No.: 17/396,146

(22) Filed: Aug. 6, 2021

(65) Prior Publication Data

US 2022/0039545 A1  Feb. 10, 2022

(30) Foreign Application Priority Data

Aug. 7, 2020  (CN) .......................... 202021631331.2
Apr. 16, 2021  (CN) .......................... 202120796162.6

(51) Int. Cl.
*A46B 13/02* (2006.01)
*A61C 17/22* (2006.01)
*A46B 5/00* (2006.01)
*A46B 9/04* (2006.01)

(52) U.S. Cl.
CPC .......... *A46B 13/023* (2013.01); *A46B 5/0095* (2013.01); *A46B 9/04* (2013.01); *A61C 17/222* (2013.01)

(58) Field of Classification Search
CPC ..... A61C 17/222; A61C 17/34; A61C 17/225; A46B 13/023; A46B 5/0095; A46B 9/04
See application file for complete search history.

(56) References Cited

U.S. PATENT DOCUMENTS

| | | |
|---|---|---|
| 3,256,031 A | 6/1966 | Fillweber |
| 3,851,984 A | 12/1974 | Crippa |
| 9,204,948 B2 * | 12/2015 | Kloster ................ A61C 17/222 |
| 9,724,180 B1 | 8/2017 | Liu |
| 10,912,377 B1 | 2/2021 | Kuang |
| 11,071,613 B1 | 7/2021 | Zhou |
| 11,096,768 B1 * | 8/2021 | Lin ...................... A61C 17/222 |
| 2001/0014990 A1 | 8/2001 | Fritsch et al. |

(Continued)

FOREIGN PATENT DOCUMENTS

| | | | |
|---|---|---|---|
| CA | 2841901 A1 * | 1/2013 | ......... A61C 17/3436 |
| CN | 1882291 A | 12/2006 | |

(Continued)

OTHER PUBLICATIONS

International Search Report dated Nov. 12, 2021 for International Application No. PCT/CN2021/111352 which is the family application of the instant application.

(Continued)

*Primary Examiner* — Shay Karls
(74) *Attorney, Agent, or Firm* — ScienBiziP, P.C.

(57) ABSTRACT

The present disclosure provides a brushhead for a power toothbrush detachably, and the power toothbrush. The brushhead configured for a power toothbrush, the brushhead being detachably installed on a handle of the power toothbrush, the brushhead comprising: a brushhead element and an engaging assembly arranged in the brushhead element, wherein the engaging assembly receives a driving shaft therein within and is configured to be driven by the driving shaft to vibrate, and wherein the engaging assembly comprises a main body and an elastic member, the elastic member is a stand-alone element arranged on the main body, and the elastic member abuts against the driving shaft.

16 Claims, 11 Drawing Sheets

(56) References Cited

U.S. PATENT DOCUMENTS

| | | | | |
|---|---|---|---|---|
| 2004/0010872 | A1* | 1/2004 | Chiang | A61C 17/34 15/28 |
| 2005/0108838 | A1* | 5/2005 | Schaefer | A61C 17/222 15/22.1 |
| 2010/0043156 | A1* | 2/2010 | Kressner | A61C 17/222 15/22.1 |
| 2010/0251493 | A1* | 10/2010 | Sale | A61C 17/222 15/22.1 |
| 2010/0273126 | A1 | 10/2010 | Janssen et al. | |
| 2011/0107536 | A1 | 5/2011 | Dabrowski et al. | |
| 2014/0150190 | A1 | 6/2014 | Fattori | |
| 2014/0341636 | A1* | 11/2014 | Fattori | A61C 17/222 403/14 |
| 2015/0082560 | A1* | 3/2015 | Graeve | A46B 5/0095 15/22.1 |
| 2015/0209125 | A1* | 7/2015 | Fattori | A61C 17/222 15/22.1 |
| 2021/0100346 | A1 | 4/2021 | Dishon | |
| 2021/0289930 | A1* | 9/2021 | Wagner | A46B 5/0095 |

FOREIGN PATENT DOCUMENTS

| | | | |
|---|---|---|---|
| CN | 101902986 | A | 12/2010 |
| CN | 103269654 | A | 8/2013 |
| CN | 105212516 | A * | 1/2016 |
| CN | 108087438 | A | 5/2018 |
| CN | 110025390 | A | 7/2019 |
| CN | 113081355 | A | 7/2021 |
| DE | 102006060134 | A1 | 6/2008 |
| FR | 2476994 | A1 | 9/1981 |
| JP | 53-21650 | B | 2/1978 |
| JP | H06-084928 | U | 12/1994 |
| JP | 2001-524331 | A | 12/2001 |
| JP | 2011-506025 | A | 3/2011 |
| JP | 2015-160127 | A | 9/2015 |
| WO | 2009/094820 | A1 | 8/2009 |
| WO | 2010/001197 | A1 | 1/2010 |
| WO | 2019072994 | A1 | 4/2019 |
| WO | 2021110464 | A1 | 6/2021 |

OTHER PUBLICATIONS

Non-Final Rejection dated Oct. 4, 2021 for U.S. Appl. No. 17/363,382 which is the parent application of the instant application.

Non-Final Rejection dated Oct. 28, 2021 for U.S. Appl. No. 17/396,176 which is the parent application of the instant application.

Final Rejection dated Jan. 26, 2022 for U.S. Appl. No. 17/363,382 which is the parent application of the instant application.

* cited by examiner

BRUSHHEAD FOR POWER TOOTHBRUSH

RELATED APPLICATIONS

This application claims the benefit of priority to Chinese Patent Application Number 202021631331.2 filed on Aug. 7, 2020 and Chinese Patent Application Number 202120796162.6 filed on Apr. 16, 2021, in the China National Intellectual Property Administration. The entire contents of the above-identified application are hereby incorporated by reference.

TECHNICAL FIELD

The disclosure relates to the technical field of power toothbrush, and particularly relates to a brushhead for a power toothbrush.

BACKGROUND

With the improvement of living standards, people are paying more and more attention to the health of teeth, and the application of power toothbrushes is becoming more and more extensive.

At present, commercially available power toothbrushes fall into two categories: one is a power toothbrush that drives brush hairs to rotate and vibrate by a motor, and the other is an ultrasonic power toothbrush that causes high-frequency vibration of a brushhead. The power toothbrushes in both categories drive the brush bristles to vibrate to achieve the purpose of teeth cleaning. The brushhead and a brush handle of the power toothbrush are generally designed to be detachable, so that the brushhead can be easily replaced. A driving rod of the brush handle is connected with the brushhead, and transmits the energy required to vibrate the brushhead. Since vibration is generated between the brush handle and the brushhead, the connection between the brush handle and the brushhead needs to be secured enough so that the brush handle and the brushhead won't separate during the vibration.

In order to meet the above described requirements, prior art provides similar mechanisms of fixedly connecting the brush handle with the brushhead, that is, a driving shaft of the brush handle is fixedly connected with the brushhead through an engaging assembly. An elastic member is arranged on the engaging assembly to provide an elastic force to abut against the driving shaft, so that the driving shaft is fixedly connected with the brushhead. However, in use, the elastic member is usually sleeved at the outside of the engaging assembly in such ways that the elastic member is prone to offset and in misalignment during use. As a result, the vibration of the power toothbrush may be unstable, and the teeth cleaning effect may not be satisfactory.

BRIEF DESCRIPTION OF DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exempla embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references may mean "at least one".

Figure 1:
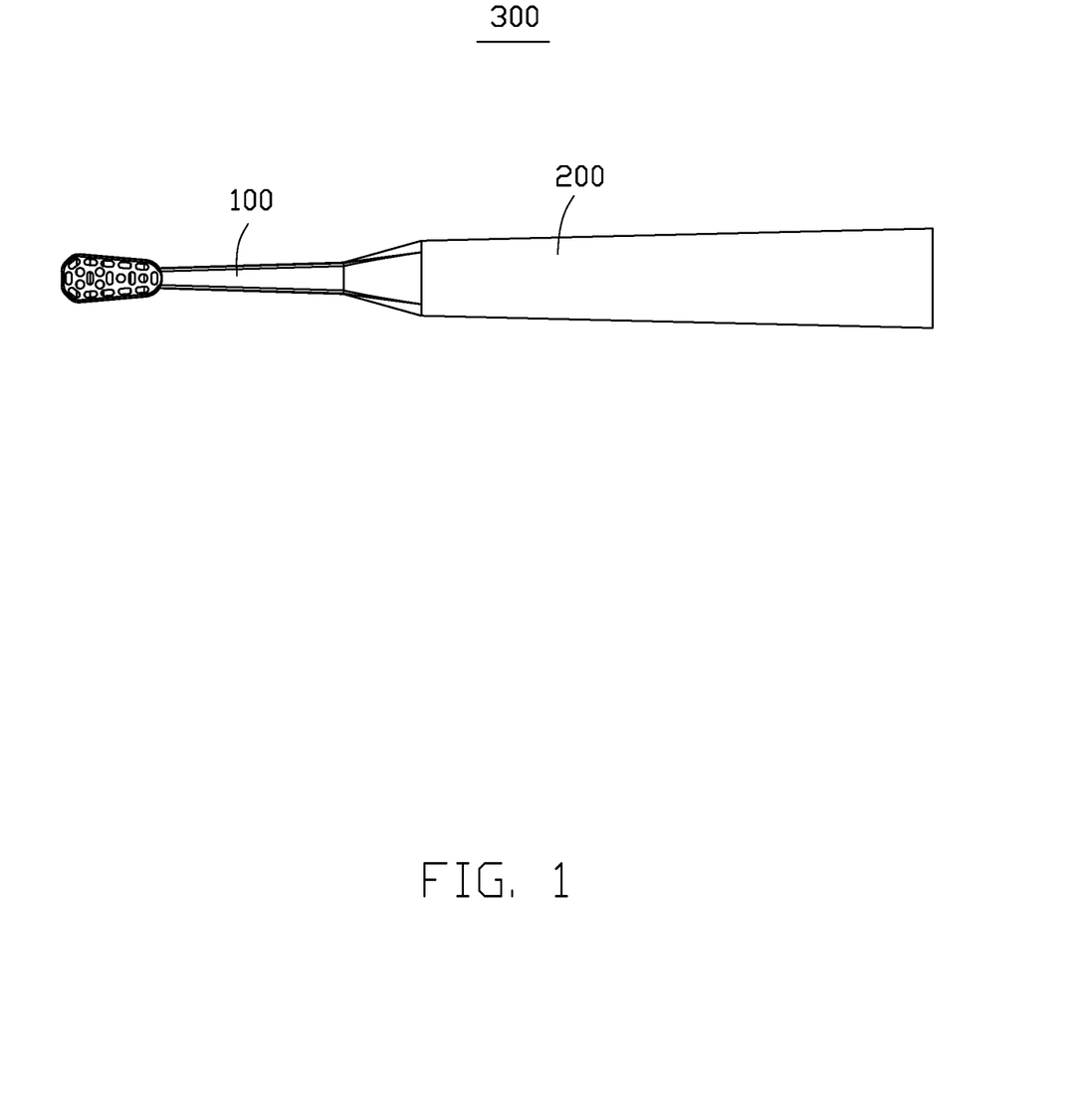
FIG. 1 is a three-dimensional structural diagram showing a power toothbrush of the present disclosure.
Figure 2:
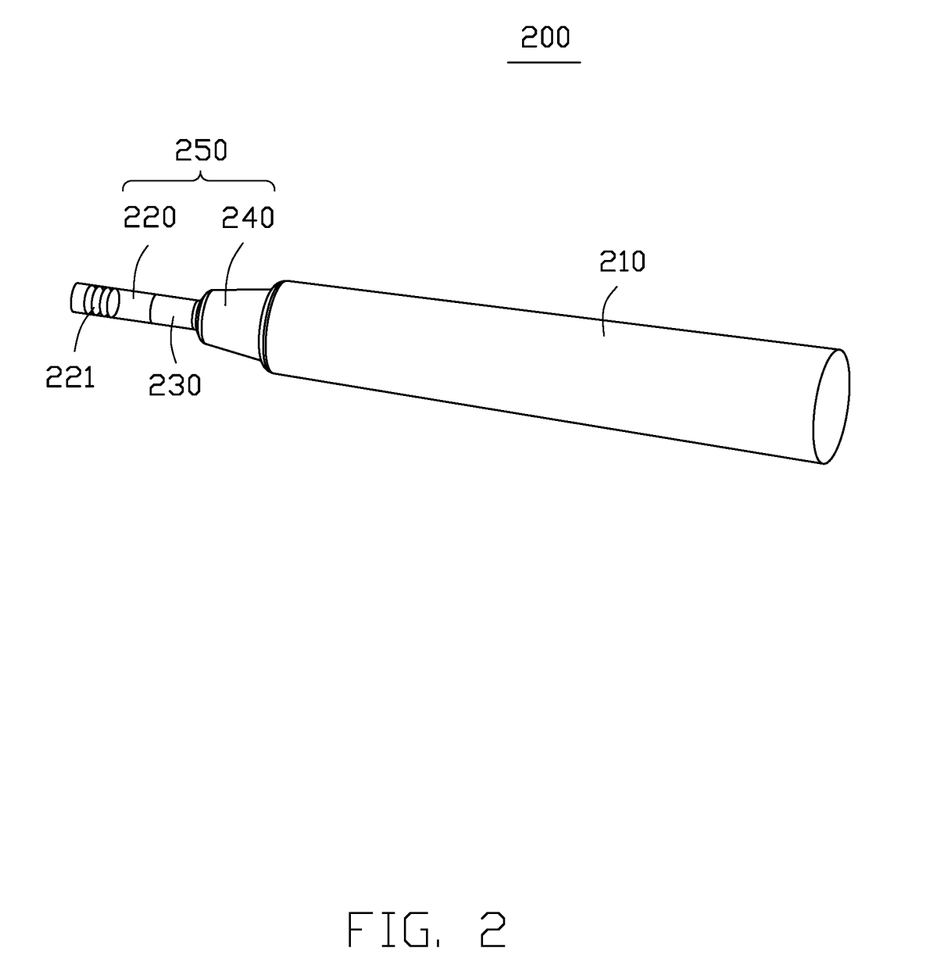
FIG. 2 is a three-dimensional structural diagram of a handle in FIG. 1.

Referring to FIG. 1 and FIG. 2, a power toothbrush 300 includes a handle 200 and a brushhead 100. The brushhead 100 is detachably attached to the handle 200 of the power toothbrush 300. The handle 200 includes a housing 210 and a driving shaft 250 extending out of the handle 200. A motor (not shown), a control board (not shown), and a battery (not shown) are received in the housing 210, with one end of the driving shaft 250 connected to the motor. At least part of the driving shaft 250 is inserted into the brushhead 100 when the brushhead 100 attached to the handle 200. The driving shaft 250 includes a first metal portion 220, a second metal portion 230 and a fixing portion 240. The first metal portion 220, the second metal portion 230 and the fixing portion 240 are inserted into the brushhead 100.

First Embodiment

In the present disclosure, referring to FIG. 3 through FIG. 6, the brushhead 100 for the power toothbrush includes a brushhead element 10 and an engaging assembly 20, the engaging assembly 20 is arranged in the brushhead element 10, the driving shaft 250 may extend into the engaging assembly 20 and drive the brushhead element 10 to vibrate through the engaging assembly 20, the engaging assembly 20 includes a main body 30 and an elastic member 40, the elastic member 40 is a stand-alone element arranged on the main body 30, and the elastic member 40 directly abuts against the driving shaft 250. When the elastic member 40 and the main body 30 are assembled, the elastic member 40 as a whole can be assembled in the main body 30 as a separate component. That is, the elastic member 40 is detachably mounted to the main body 30. In this embodiment, the brushhead element 10 is three-dimensional, the elastic member 40 abuts only one side of the driving shaft 250 and is arranged along a longitudinal direction of the brushhead element 10, and the longitudinal direction is parallel to a direction that the driving shaft 250 inserts into the main body.

Figure 3:
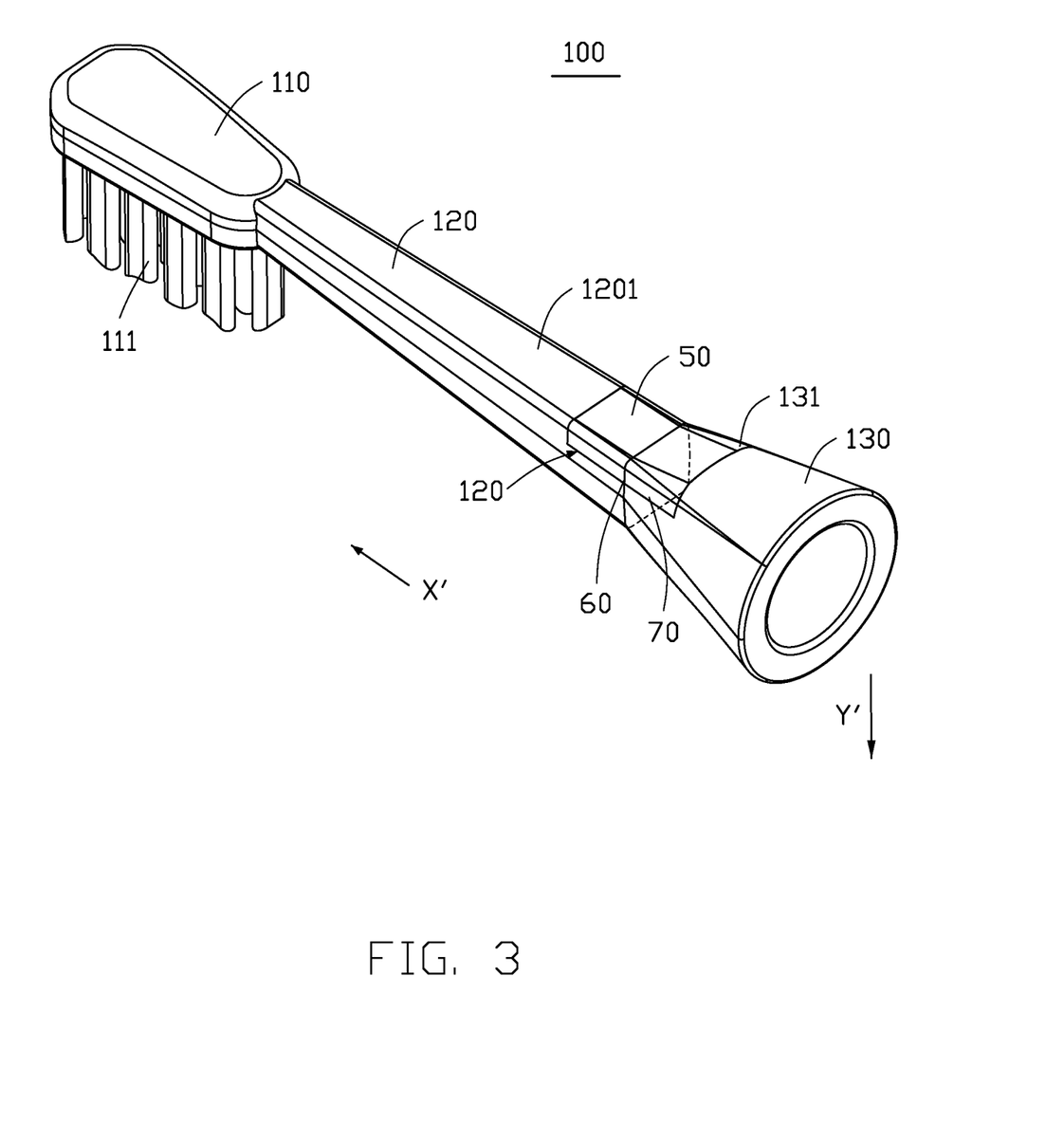
FIG. 3 is a three-dimensional structural diagram showing a brushhead of a power toothbrush according to a first embodiment of the present disclosure.

Specifically, referring to FIG. 3, the brushhead element 10 includes a bristle carrier 110, a neck portion 120 and an insertion portion 130. The bristle carrier 110 and the insertion portion 130 are respectively located at both ends of the neck portion 120. The bristle carrier 110 is provided with a plurality of brush bundles 111 for cleaning the oral cavity. In this embodiment, the bristle carrier 110 can be any well-known structure, and thus will not be repeated here.

In this embodiment, the neck portion 120 is an elongated rod-shaped structure, which is approximately cuboid, and the insertion portion 130 is approximately in a topless cone shape. Of course, in other embodiments, the neck portion 120 can also be substantially cylindrical, and the insertion portion 130 can also have other shapes, which is not specifically limited in the present disclosure.

In this embodiment, the neck portion 120 includes a first surface 1201 the insertion portion 130 includes a second surface 131, and an accommodating portion 12 is formed at the joint between the first surface 1201 and the second surface 131.

In this embodiment, the brushhead element 10 can be made of ABS plastic, PP plastic or POM plastic. In other embodiments, the brushhead element 10 can also be made of other materials, which is not specifically limited in the present disclosure.

The brushhead element 10 is provided with an accommodating portion 12, and the accommodating portion 12 is configured for accommodating the engaging assembly 20.

Further, the housing part 12 is a recess. The accommodating portion 12 includes a first containing cavity 121 and a surface of the first containing cavity 121 defines a notch 122, and the first containing cavity 121 is in air communication with the notch 122 to form the accommodating portion 12 with a stepped cross section.

In this embodiment, the accommodating portion 12 is formed on the side face of the brushhead element 10. Further, the accommodating portion 12 is formed at the joint between the neck portion 12 and the insertion portion 13, and the accommodating portion 12 is symmetrical relative to a plane 70 where a connecting line 60 between the neck portion 120 and the insertion portion 130 is located.

Figure 4:
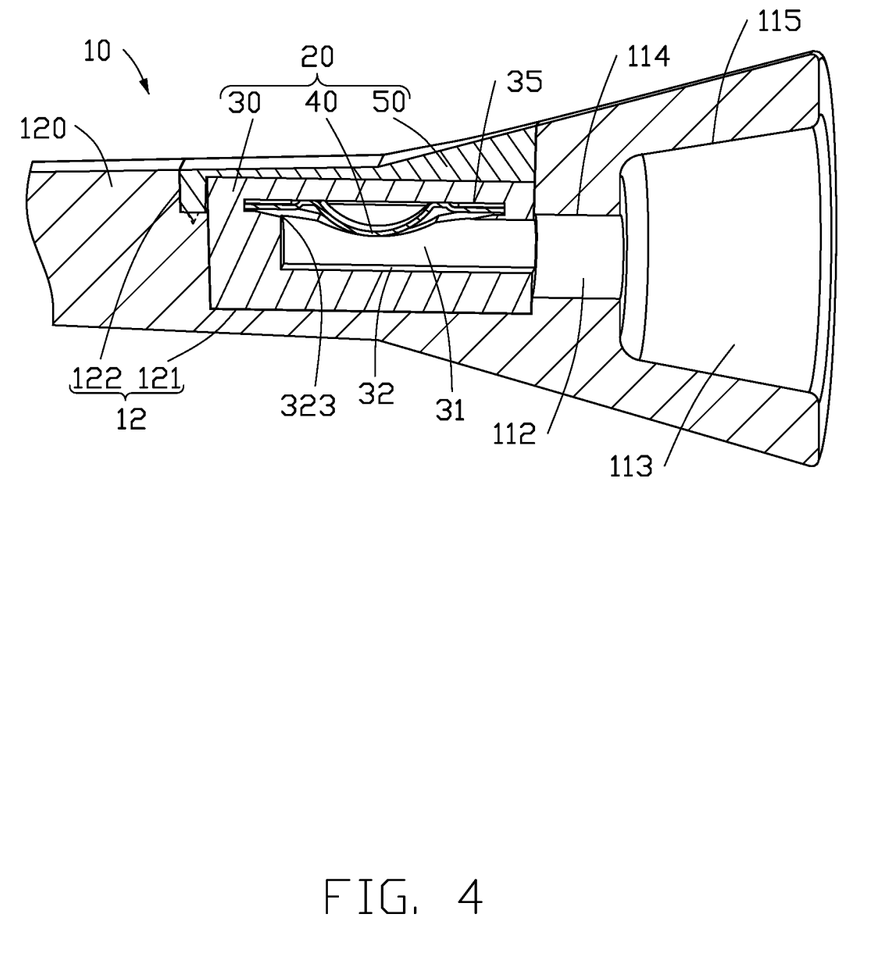
FIG. 4 is a cross-sectional view of the brushhead of the power toothbrush shown in FIG. 3 along a first direction X'.
Figure 5:
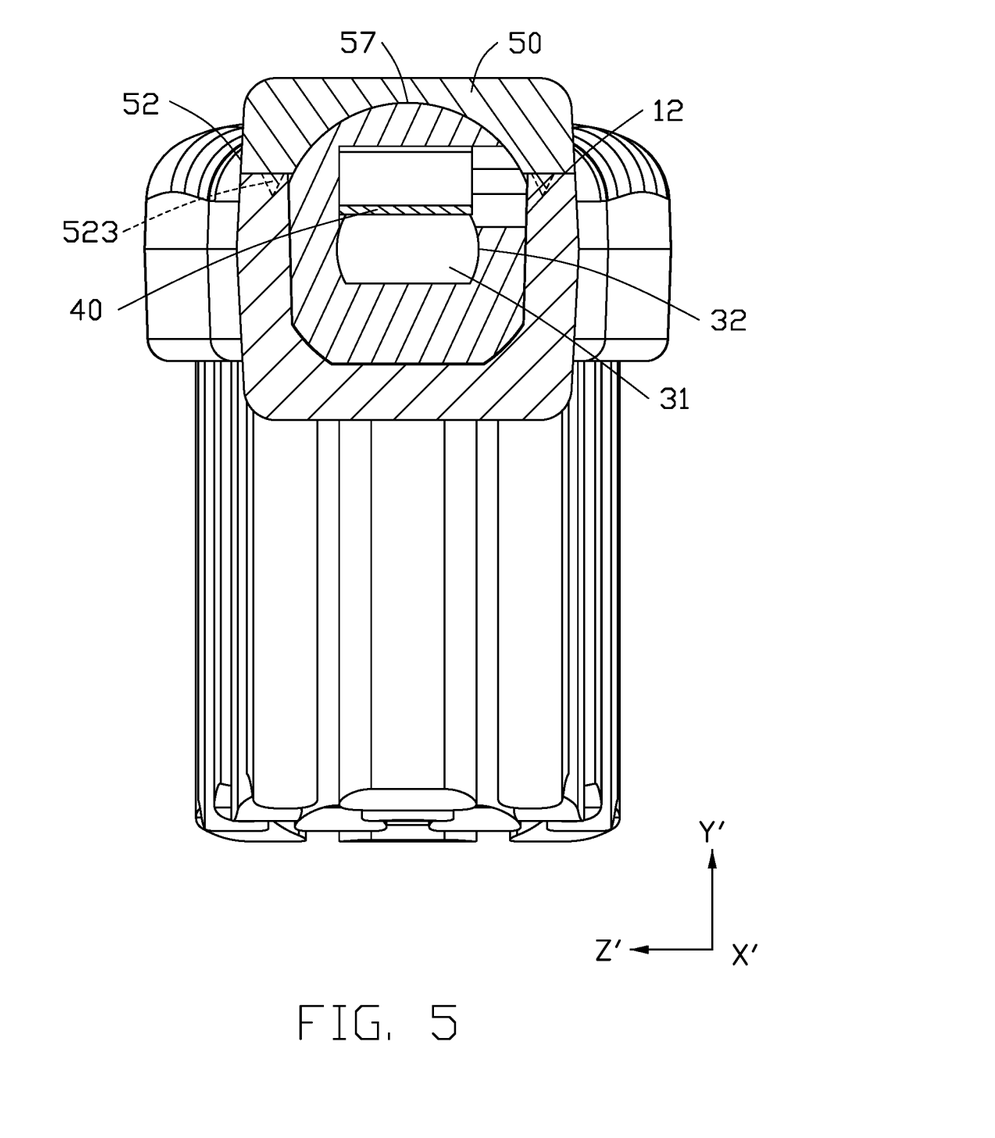
FIG. 5 is a cross-sectional view of the brushhead of the power toothbrush shown in FIG. 3 along a second direction Y'.
Figure 6:
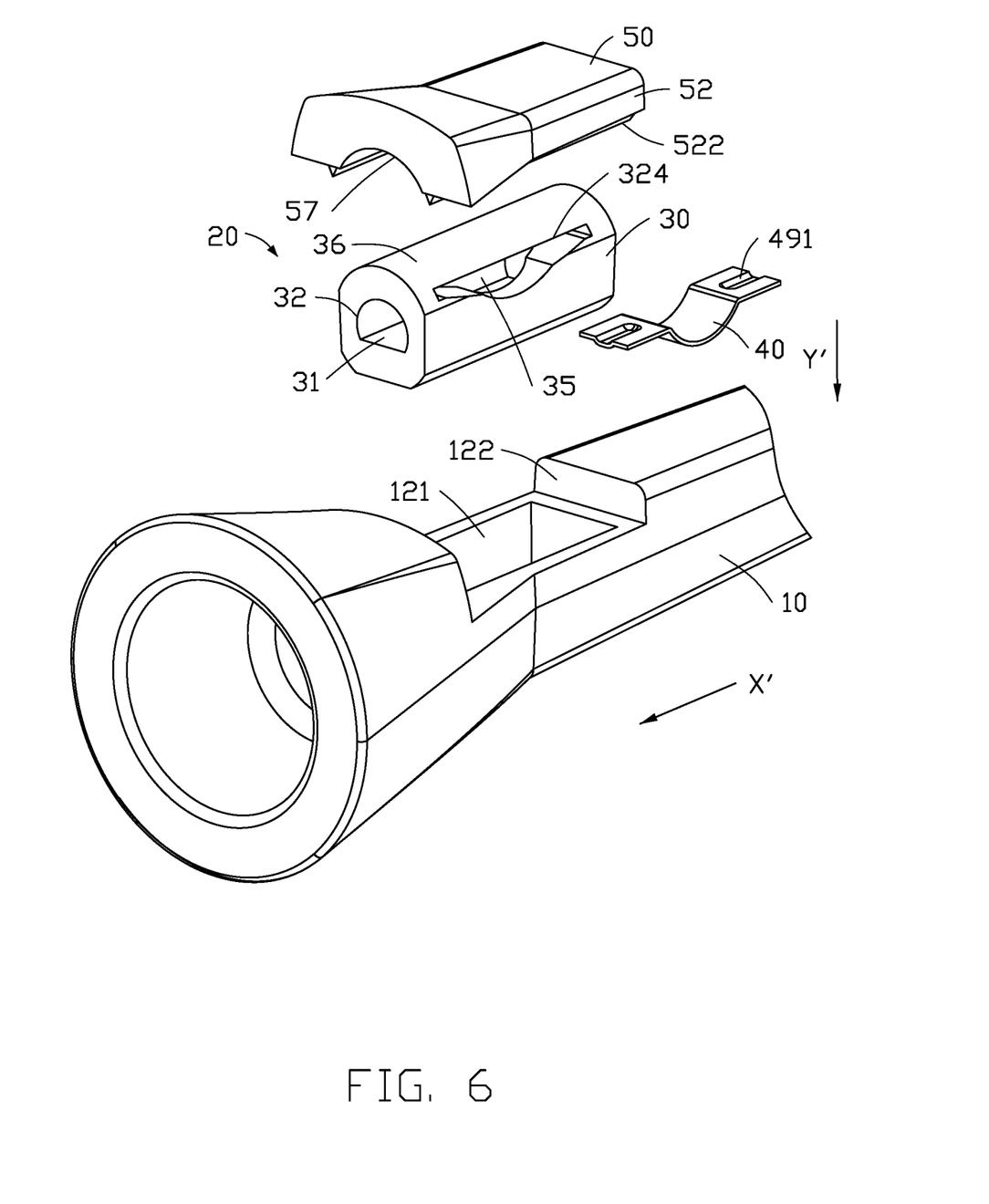
FIG. 6 is an exploded view of the brushhead of the power toothbrush shown in FIG. 3.

The main body 30 is accommodated in the first containing cavity 121, and one end of the main body 30 close to the handle 200, that is, the first end, comprises a first receiving cavity 31 and a second receiving cavity 35 along a first direction X'. The first receiving cavity 31 and the second receiving cavity 35 at least partially overlap each other correspondingly in a second direction Y', the first receiving, cavity 31 is configured for accommodating at least a part of the driving shaft 250, the second receiving cavity 35 is configured for accommodating the elastic member 40. At least one side face of the main body 30 is provided with an embedding hole 324, the embedding hole 324 embeds the elastic member 40 into the second receiving cavity 35 along a third direction Z', so as to arrange the elastic member 40 in the main body 30, the elastic member 40 abuts against at least a part of the driving shaft 250 along the second direction Y'. The first direction X' is a direction from the end of the brushhead element 10 connected to the handle 200 toward the end of the brushhead element 10 away from the handle 200, the second direction Y' is a direction from the second receiving cavity 35 of the main body 30 to the first receiving cavity 31, and the third direction Z' is a direction vertical to both of the first direction X' and the second direction Y'.

By forming the first receiving cavity 31 and a second receiving cavity 35 on the main body 30, and embedding the elastic member 40 into the second receiving cavity 35 along the third direction Z', the elastic member 40 can be stably arranged in the main body 30, and the elastic member 40 abuts against at least a part of the driving shaft 250 along the second direction Y', so that the brushhead element 10 is fixedly connected with the first metal portion 220 of the driving shaft 250. Since the position of the embedding hole 324 is vertical to the direction of the elastic force of the elastic element 40, the elastic element 40 is prevented from offsetting, and the elastic element 40 is firmly fixed in the main body 30, which can effectively prevent the elastic element 40 from detaching from the inside of the main body 30 and improve the stability.

The first metal portion 220 is provided with a pattern 221, and the elastic member 40 abuts against the pattern 221 to connect the driving shaft 250 with the brushhead 100 for the power toothbrush.

The main body 30 includes a cavity wall 32 forming the first receiving cavity 31, an opening 323 is formed on the cavity wall 32, and at least a portion of the elastic member 40 extends through the opening 323, so that the elastic member 40 abuts against at least a part of the driving shaft 250, that is, the elastic member 40 includes a portion passing through the opening 323 and abutting against the driving shaft 250.

In some embodiments, the elastic member 40 comprises a metal member which abuts against the driving shaft 250, and a thin film (not shown) also be formed on a surface of the metal member to prevent the elastic member 40 from directly contacting the driving shaft 250, so that noise and other situations can be prevented more effectively. Alternatively, the thin film can also be omitted, or the thin film can be formed only on the surface of the elastic member 40 that is in contact with the driving shaft 250, or can be formed on the entire surface of the elastic member 40, which is not limited here.

The thin film can be made of wear-resistant plastic or rubber oil and other materials, which is not limited here.

Figure 7:
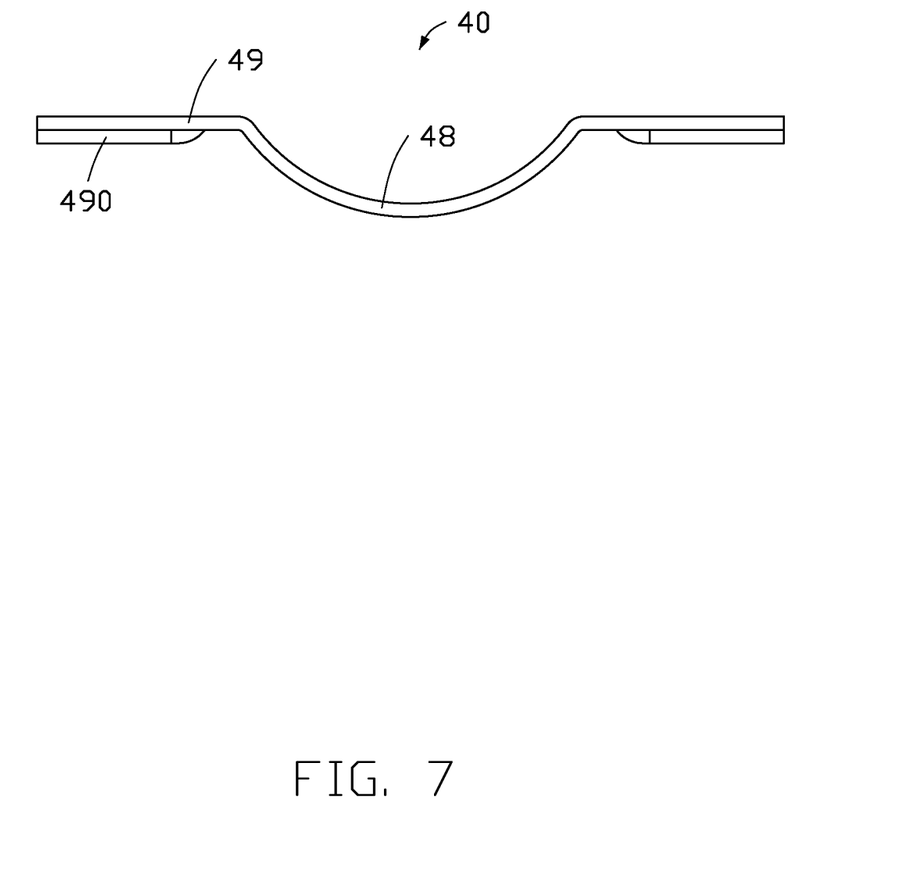
FIG. 7 is a front view of an elastic member in the brushhead of the power toothbrush.
Figure 8:
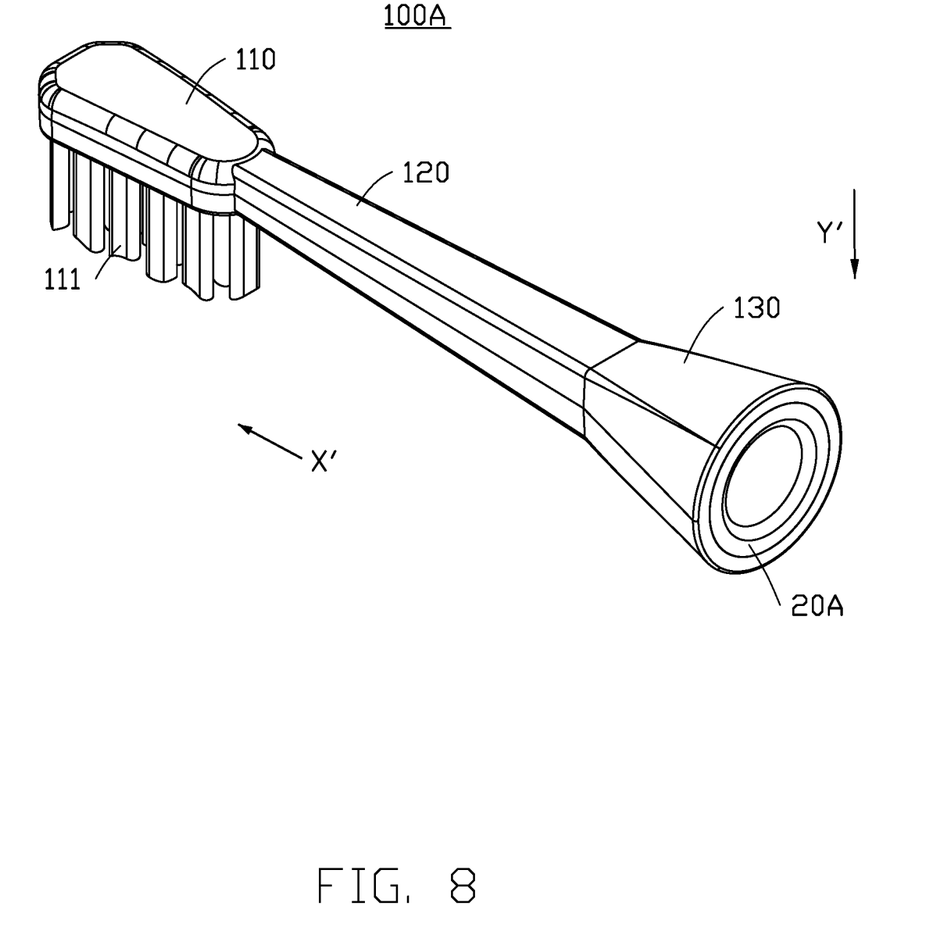
FIG. 8 is a three-dimensional structural diagram showing a brushhead of a power toothbrush according to a second embodiment of the present disclosure.
Figure 9:
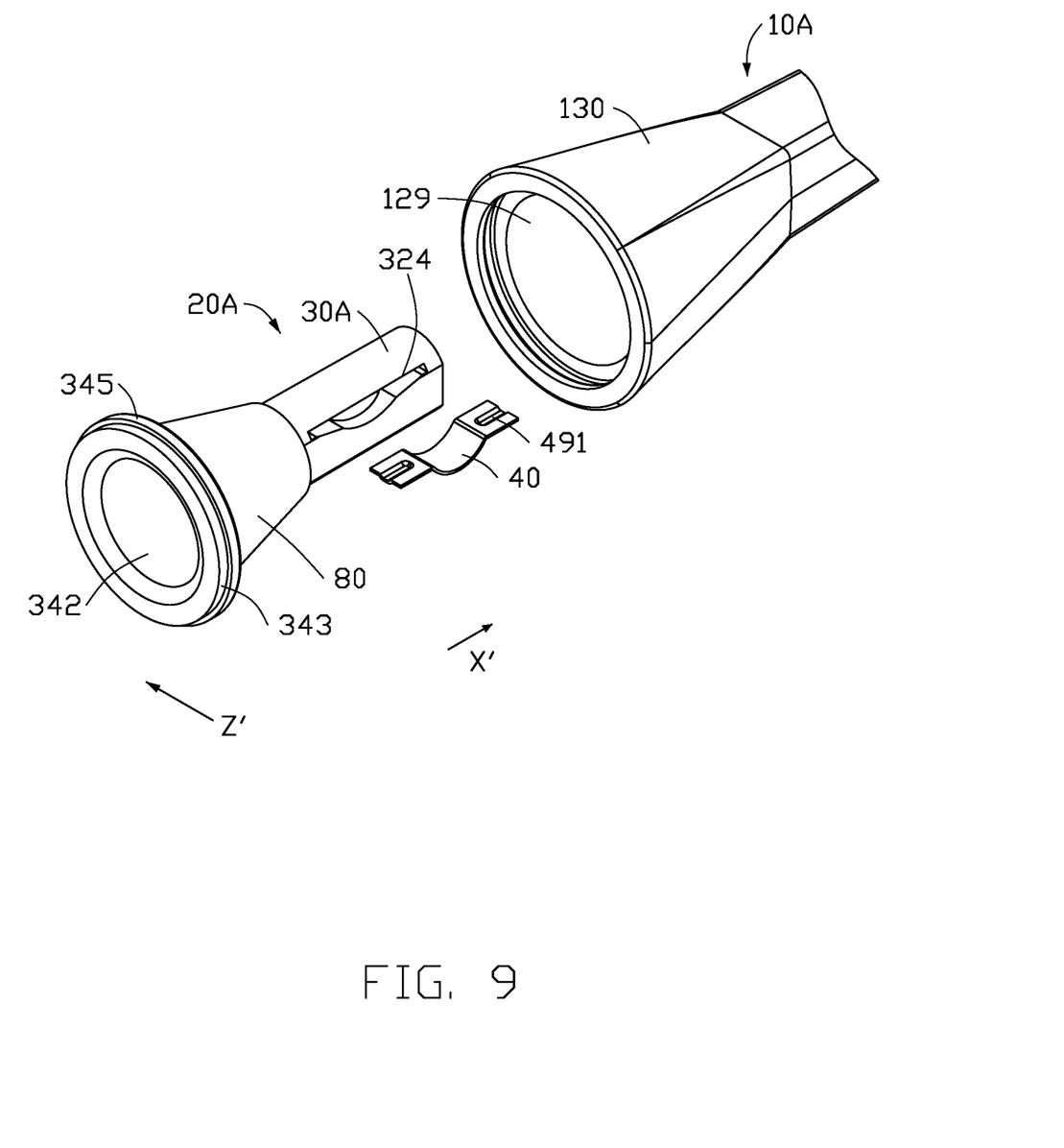
FIG. 9 is an exploded view of the brushhead of the power toothbrush shown in FIG. 8.
Figure 10:
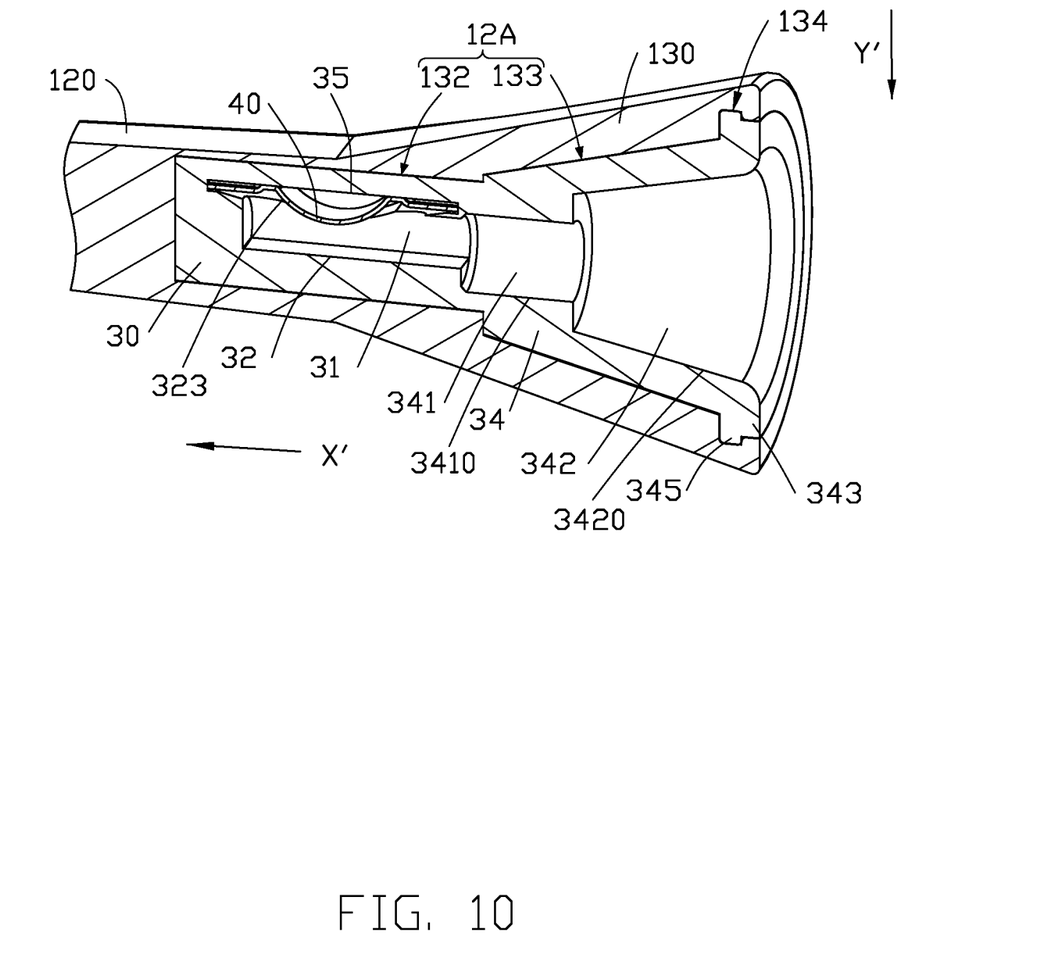
FIG. 10 is a cross-sectional view of the brushhead of the power toothbrush shown in FIG. 8 along the first direction X'.
Figure 11:
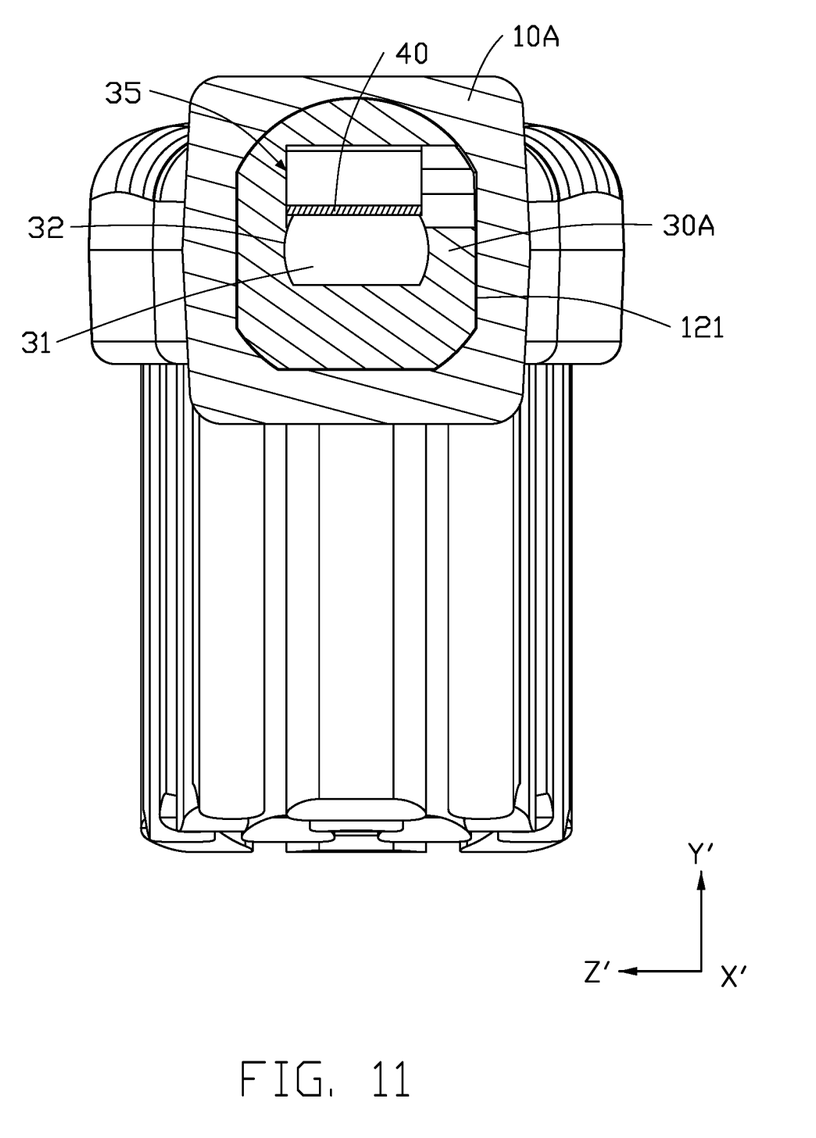
FIG. 11 is a cross-sectional view of the brushhead of the power toothbrush shown in FIG. 8 along the second direction Y'.

Referring to FIG. 4, FIG. 6 and FIG. 7, the elastic member 40 includes a curved surface portion 48 and two plane portions 49, the two plane portions 49 are respectively located on both sides of the curved surface portion 48, and the curved surface portion 48 is arched to abut against at least a part of the driving shaft 250.

The thickness of the elastic member 40 ranges from 0.05 mm to 7.00 mm, such as 0.1 mm and 0.3 mm, and the width of the curved surface portion 48 of the elastic member 40 ranges from 0.1 mm to 7.00 mm, such as 2.9 mm and 3.5 mm.

In this embodiment, the material of the elastic member 40 can be beryllium copper or stainless steel. In other embodiments, the elastic member 40 can also be made of other materials, which is not specifically limited in the present disclosure.

By selecting the above-mentioned materials, the elastic force of the elastic member 40 can not only be ensured, and the clamping strength can also be ensured.

At least one rib 490 is convexly arranged on the surface of each of the two plane portion(s) 49, and the protrusion direction of the rib 490 is consistent with the direction of the arched protrusion of the curved surface portion 48.

In this embodiment, a rib 490 is convexly arranged on the surface of the plane portion 49, and the rib 490 is arranged to extend along the length direction of the elastic member 40. The ribs 490 can be arranged in parallel at intervals in any direction, and of course, other forms can also be adopted, which is not limited here.

If the rib 490 is not provided, the curved surface portion 48 is easily deformed by an external force. In this embodiment, since at least one rib 490 is convexly arranged on the surface of the third plane portion 49, during the use of the power toothbrush 300, even if the elastic member 40 receives an external force, the curved surface portion 48 is unlikely to deform under the extrusion of the external force. Therefore, the rib 490 can increase the resilience force, thereby effectively strengthening the stability of the elastic member 40, and the driving shaft 250 can be firmly and fixedly connected.

The engaging assembly 20 further includes a cover 50, and the cover 50 is configured for fixing the main body 30 in the first containing cavity 121.

The cover 50 is fixedly connected with the brushhead element 10 through a buckle structure or the ultrasonic welding technology.

The cover 50 is fixed in the notch 122 through the ultrasonic welding technology.

Specifically, referring to FIG. 5 through FIG. 6, the cover 50 includes two opposite first side walls 52, before the cover is fixed in the notch 122 through the ultrasonic welding technology, a connecting portion 522 is arranged at one end of each first side wall 52 away from the outer surface, and the thickness of the connecting portion 522 is thinner than other areas (as shown in FIG. 5). In this way, an ultrasonic line (not shown) is formed between the connecting portion 522 and other areas; and after the cover 50 is fixed in the notch 122 through the ultrasonic welding technology, the connecting portion 522 is welded with a part of the brushhead element 100 to form a welding area 523, so that the cover 50 is fixedly connected with the brushhead element 100 (as shown in FIG. 6).

By arranging the connecting portion 522 on the first side wall 52 of the cover 50, the connecting portion 522 is easier to perform a welding action and provides a sufficient space for welding with at least a part of the brushhead element 100. Further, the cover 50 is fixed in the notch 122 through the ultrasonic welding technology, so that the structure is simple, and the connection is more stable. In addition, after the welding through the ultrasonic welding technology, the first side wall 52 and the plastic part of the brushhead element 100 are fused into a whole.

In other embodiments, the outer surface of the cover 50 can be provided with a desired pattern, shape, color and the like according to requirements, which is not specifically limited in the present disclosure.

The brushhead element 10 is further formed with a first space-keeping cavity 112 and a second space-keeping cavity 113 along the first direction X'. When the brushhead 100 for the power toothbrush is in an assembled state, the first receiving cavity 31 and the second space-keeping cavity 113 are respectively located at both ends of the first space-keeping cavity 112, and the first space-keeping cavity 112 and the second space-keeping cavity 113 respectively accommodate the second metal portion 230 and the fixing portion 240 of the handle 200.

wall surface of the first space-keeping cavity is not in contact with the second metal portion, and wall surface of the second space-keeping cavity is not in contact with the fixing portion.

The second metal portion 230 is not in contact with the wall surface 114 of the first space-keeping, cavity 112, and the fixing portion 240 is not in contact with the wall surface 115 of the second space-keeping cavity 113, so as to avoid affecting the driving shaft from driving the brushhead 100 for the power toothbrush to vibrate.

In addition, in this embodiment, the top wall 36 of the main body 30 is arc-shaped, and the shape of the bottom wall 57 of the cover 50 matches that of the top wall 36 of the main body 30 so as to be better attached to the top wall 36 of the main body 30. Of course, in other embodiments, the top wall 36 can also be planar, as long as the shape of the bottom wall 57 of the cover 50 matches that of the top wall 36 of the main body 30.

According to this embodiment, since the elastic member 40 directly abuts against at least a part of the driving shaft 250, the elastic force of the elastic member 40 can intensively and directly act on the driving shaft 250. In this way, the brushhead element 10 and the handle 200 can be firmly connected, and the handle 200 can drive the brushhead 100 for the power toothbrush to vibrate. The structure for connecting the brushhead element 10 with the handle 200 is simple, therefore, the brushhead 100 for the power toothbrush is simple in structure, easy to manufacture and low in production cost. In addition, by embedding into the second receiving cavity 35 along the third direction Z', since the position of the embedding, hole 324 is vertical to the direction of the elastic force of the elastic element 40, the elastic element 40 is prevented from offsetting, and the elastic element 40 is firmly fixed in the main body 30, which can effectively prevent the elastic element 40 from detaching from the inside of the main body 30 and improve the stability.

Second Embodiment

Hereinafter, the second embodiment of the present disclosure will be described with reference to FIG. 8 through FIG. 11. In addition, for the convenience of description, components having the same functions as those described in the above-mentioned embodiment are marked with the same reference signs, and are not repeatedly described.

The difference between a brushhead 100A for a power toothbrush in the second embodiment and the brushhead 100 for the power toothbrush in the first embodiment lies in the difference in the arrangement position of an engaging assembly 20A.

Referring to FIG. 8 through FIG. 11, an accommodating portion 12A is formed in a brushhead element 10A along the first direction X, and the accommodating portion 12A is configured for accommodating the engaging assembly 20A.

The accommodating portion 12A includes a first containing cavity 121 and a second containing cavity 129.

The engaging assembly 20A includes a main body 30A and an elastic member 40, the main body 30A is accommodated in the first containing cavity 121, one end of the main body 30A close to the handle 200, that is, the first end, is provided with an extension portion 34 along a direction opposite to the first direction X' in an extension manner, and the extension portion 34 is accommodated in the second containing cavity 129.

A first receiving cavity 31 is formed in the main body 30A along the first direction X' a first space-keeping cavity 341 and a second space-keeping cavity 342 are formed in the extension portion 34, when the brushhead 100A for the power toothbrush is in an assembled state, the first receiving cavity 31 and the second space-keeping cavity 342 are respectively located at the both ends of the first space-keeping cavity 341, and the first space-keeping cavity 341 and the second space-keeping cavity 342 respectively accommodate the second metal portion 230 and the fixing portion 240 of the handle 200.

The second metal portion 230 is not in contact with the wall surface 3410 of the first space-keeping cavity 341, and the fixing portion 240 is not in contact with the wall surface 3420 of the second space-keeping cavity 342, so as to avoid affecting the driving shaft from driving the brushhead 100A for the power toothbrush to vibrate.

The end portion of the extension portion 34 close to the handle 200 is also provided with a boss 343 in an extension manner, a protrusion portion 345 is further arranged between the boss 343 and the extension portion 34, a groove 134 is formed in a position on the inner wall of the second containing cavity 129 corresponding to the protrusion portion 345, and in the assembled state of the brushhead for the power toothbrush, the protrusion portion 345 is inserted into the groove 134 to fixedly arrange the main body 30A in the second containing cavity 129, so that the main body 30A is fixedly connected with the brushhead element 10A.

According to this embodiment, by forming the first receiving cavity 31 and the second receiving cavity 35 on the main body 30A, and embedding the elastic member 40 into the second receiving cavity 35 along the third direction Z', the elastic member 40 can be firmly arranged in the main body 30A, and the elastic member 40 abuts against the pattern 221 on the first metal portion 220 of the driving shaft 250 along the second direction Y', so that the brushhead element 10A is fixedly connected with the first metal portion 220 of the driving shaft 250. The first metal portion 220 is provided with the pattern 221, and the elastic member 40 abuts against the pattern 221 to connect the driving shaft 250 with the brushhead 100 for the power toothbrush.

According to this embodiment, since the elastic element 40 directly abuts at least a part of the driving shaft 250, and further, the elastic element 40 directly abuts against the pattern 221 on the first metal portion 220 of the driving shaft 250, so the elastic force of the elastic member 40 can intensively and directly act on the driving shaft 250. In this way, the brushhead element 10A and the handle 200 can be firmly connected, and the handle 200 can drive the brushhead 100 for the power toothbrush to vibrate. The structure for connecting the brushhead element 10A with the handle 200 is simple. Therefore, the brushhead 100 for the power toothbrush is simple in structure, easy to manufacture and low in production cost.

In addition, in this embodiment, by embedding into the second receiving cavity 35 along the third direction Z', since the position of the embedding hole 324 is vertical to the direction of the elastic force of the elastic element 40, the elastic element 40 is prevented from offsetting, and the elastic element 40 is firmly fixed in the main body 30, which can effectively prevent the elastic element 40 from detaching from the inside of the main body 30A and improve the stability. In addition, since the extension portion 34 is arranged in the main body 30A and is accommodated in the accommodating portion 12A, the structure is simple, and volume production is facilitated.

What have been disclosed above are only the preferred embodiments of the present application, which of course cannot be used for limiting the present disclosure. Therefore, equivalent changes made in accordance with the present disclosure still fall within the scope of the present disclosure.

An embodiment of the present disclosure has the following features:

One embodiment of the present disclosure provides a brushhead for a power toothbrush. The brushhead configured for a power toothbrush, the brushhead being detachably installed on a handle of the power toothbrush, the brushhead comprising: a brushhead element and an engaging assembly arranged in the brushhead element, wherein the engaging assembly receives a driving shaft therein within and is configured to be driven by the driving shaft to vibrate, and wherein the engaging assembly comprises a main body and an elastic member, the elastic member is a stand-alone element arranged on the main body, and the elastic member abuts against the driving shaft.

In some embodiments, the brushhead element is three-dimensional, and the elastic member abuts only one side of the driving shaft and is arranged along a longitudinal direction of the brushhead element, and the longitudinal direction is parallel to a direction that the driving shaft inserts into the main body.

In some embodiments, the main body comprises a first receiving cavity along a first direction, the first receiving cavity is configured for accommodating the driving shaft, the main body further comprises a cavity wall forming the first receiving cavity, an opening is formed on the cavity wall, and at least a part of the elastic member extends through the opening, the first direction is a direction from an end of the brushhead element connected to the handle toward an end of the brushhead element away from the handle.

In some embodiments, the portion of the elastic member extending through the opening is configured to abut, the driving shaft.

In some embodiments, further comprising a second receiving cavity, wherein the second receiving cavity is configured for accommodating the elastic member, the first receiving cavity and the second receiving cavity at least partially overlap each other correspondingly in a second direction, the first receiving cavity communicates with the second receiving cavity through the opening, and the second direction is perpendicular to the first direction.

In some embodiments, one side of the second receiving cavity is defines an embedding hole, and the embedding hole is configured for embedding the elastic member into the second receiving cavity.

In some embodiments, the second receiving cavity is formed in the main body.

In some embodiments, at least one side face of the main body defines an embedding hole, the embedding hole is configured for embedding the elastic member into the second receiving cavity along a third direction, and the third direction is a direction perpendicular to both the first direction and the second direction.

In some embodiments, the elastic member comprises a metal member.

In some embodiments, a thin film is formed on a surface of the metal member which abuts against the driving shaft.

In some embodiments, the elastic member comprises a curved surface portion and two plane portions, the two plane portions are respectively on both sides of the curved surface portion, and the curved surface portion abuts against the driving shaft.

In some embodiments, at least one rib is convexly arranged on the surface of each of the two plane portions.

In some embodiments, the curved surface portion abuts against a pattern of the driving shaft.

In some embodiments, the brushhead element comprises an accommodating portion configured to accommodate the engaging assembly.

In some embodiments, the accommodating portion is formed on a side face of the brushhead element, the accommodating portion comprises a first containing, cavity configured to accommodating the main body, a surface of the first containing cavity defines a notch, and the engaging assembly further comprises a cover, and the engaging assembly is fixedly arranged in the notch.

In some embodiments, the brushhead element further comprises a first space-keeping cavity and a second space-keeping cavity along a first direction, when the brushhead is assembled, the first receiving cavity and the second space-keeping cavity are respectively located at the both ends of the first space-keeping cavity, and the first space-keeping cavity and the second space-keeping, cavity respectively accommodate a second metal portion and a fixing portion of the handle, the first direction is a direction from an end of the brushhead element connected to the handle toward an end, of the brushhead element away from the handle.

In some embodiments, the cover is fixedly connected with the brushhead element by ultrasonic welding.

In some embodiments, wall surface of the first space-keeping cavity is not in contact with the second metal portion, and wall surface of the second space-keeping cavity is not in contact with the fixing portion.

One embodiment of the present disclosure provides a power toothbrush. The power toothbrush comprising: a brushhead configured for the power toothbrush, and a handle, wherein the brushhead is detachably installed on the handle, the handle comprising a driving shaft extending from the handle, the brushhead comprising: a brushhead element and an engaging assembly arranged in the brushhead element, wherein the engaging assembly receives the driving shaft therein within and is configure to be driven by the driving shaft to vibrate, and wherein the engaging assembly comprises a main body and an elastic member, the elastic member is a stand-alone element arranged on the main body, and the elastic member directly abuts against the driving shaft.

What is claimed is:

1. A brushhead configured for a power toothbrush, the brushhead being detachably installed on a handle of the power toothbrush, the brushhead comprising:
    a plurality of brush bundles,
    a brushhead element configured for holding the brush bundles, and
    an engaging assembly arranged in the brushhead element, and configured for engaging with a driving shaft of the power toothbrush and be driven by the driving shaft to vibrate, and
    the engaging assembly comprises a main body coupled to the brushhead element and a metal elastic member held by the main body, the metal elastic member comprises an abutting portion, and a portion located at a side of the abutting portion and configured for engaging with the main body, the abutting portion protrudes from the portion which engages with the main body, the abutting portion is configured for contacting and pressing the driving shaft, and
    the metal elastic member is configured to be compressed away from the driving shaft when the brushhead element is engaged with the handle,
    the main body of the engaging assembly comprises a first receiving cavity penetrating at least a part of the main body along a first direction parallel to an inserting direction of the driving shaft for accommodating the driving shaft, an opening is formed in a cavity wall of the main body which defines the first receiving cavity, and the abutting portion of the metal elastic member extends into the first receiving cavity via the opening so that to contact and press the driving shaft.

2. The brushhead according to claim 1, wherein the metal elastic member directly abuts only one side of the driving shaft and is arranged along a first direction parallel to an inserting direction of the driving shaft.

3. The brushhead according to claim 1, wherein the brushhead further comprises a second receiving cavity, configured for accommodating the metal elastic member, the first receiving cavity and the second receiving cavity are separated by the cavity wall, and the first receiving cavity communicates with the second receiving cavity via the opening.

4. The brushhead according to claim 3, wherein one side wall of the second receiving cavity defines an embedding hole configured for embedding the metal elastic member into the second receiving cavity.

5. The brushhead according to claim 4, wherein the embedding hole has a corresponding shape with the shape of the metal elastic member, the embedding hole is arranged on the main body in a slender strip shape, a first inner surface and a second inner surface of the embedding hole are arranged opposite to each other, and the first inner surface is a long strip shape extending along the first direction, and the second inner surface is shaped as an arch.

6. The brushhead according to claim 4, wherein the metal elastic member is inserted into the second receiving cavity via the embedding hole along a third direction perpendicular to both the first direction and a direction of the pressure force provided by the metal elastic member.

7. The brushhead according to claim 1, wherein the portion which engages with the main body is not in contact with the driving shaft.

8. The brushhead according to claim 1, wherein the brushhead further comprises a second receiving cavity configured for accommodating the metal elastic member, the portion having a first end away from the abutting portion, the first end is clamped by two clamping walls formed in the second receiving cavity, and the two clamping walls are overlapped in a second direction different from a first direction parallel to an inserting direction of the driving shaft.

9. The brushhead according to claim 1, wherein the engaging assembly is a stand-alone element, and is fixed in a rod part of the brushhead element as a whole when assembling the engaging assembly into the rod part.

10. The brushhead according to claim 9, wherein
the rod part of the brushhead element comprises an accommodating portion configured to accommodate the engaging assembly.

11. The brushhead according to claim 10, wherein
the accommodating portion is formed on a side wall of the rod part, the accommodating portion comprises a first containing cavity configured to accommodating the main body, a surface of the first containing cavity defines a notch, and the engaging assembly further comprises a cover, and the engaging assembly is fixedly arranged in the notch.

12. A brushhead configured for a power toothbrush, the brushhead being detachably installed on a handle of the power toothbrush, the brushhead comprising:
a plurality of brush bundles,
a brushhead element configured for holding the brush bundles, and
an engaging assembly arranged in the brushhead element, and configured for engaging with a driving shaft of the power toothbrush and be driven by the driving shaft to vibrate, and
the engaging assembly comprises a main body coupled to the brushhead element and a metal elastic member held by the main body, the metal elastic member comprises an abutting portion, and a portion located at a side of the abutting portion and configured for engaging with the main body, the abutting portion protrudes from the portion which engages with the main body, the abutting portion is configured for contacting and pressing the driving shaft, and
the metal elastic member is configured to be compressed away from the driving shaft when the brushhead element is engaged with the handle,
at least one rib is convexly arranged on a surface of the portion which engages with the main body.

13. A brushhead configured for a power toothbrush detachably attached to a handle of the power toothbrush, the handle including a driving shaft, the brushhead comprising:
a plurality of brush bundles,
a brushhead element configured for holding brush bundles, and
an engaging assembly arranged in the brushhead element and configured for engaging with the driving shaft and be driven by the driving shaft to vibrate, and
the engaging assembly comprises a main body coupled to the brushhead element and a metal elastic member held by the main body, the main body is made of non-metal material, the metal elastic member has a abutting portion configured for contacting the driving shaft and an end coupled to the abutting portion, wherein the main body has a configuration which engages with the end of the metal elastic member and has another configuration which allows the abutting portion being arranged to the main body; and, wherein the metal elastic member is engageable with only one side of the driving shaft and deformed away the driving shaft so as to provide a revolving force on the driving shaft, the main body further comprises a first receiving cavity configured for accommodating the metal elastic member, the first receiving cavity defines an opening on a side wall of the main body, and a longitude of the opening is parallel to and offsets a direction that the drive shaft inserts to the main body, the another configuration is the opening which allows the abutting portion to be inserted therethrough without be deformed.

14. The brushhead according to claim 13, wherein the first receiving cavity further defines a hole corresponding to at least part of the driving shaft so that at least part of the abutting portion extends out of the hole and contacting the at least part of the driving shaft.

15. The brushhead according to claim 14, wherein the main body further comprises a second receiving cavity configured for accommodating the driving shaft, the first receiving cavity and the second receiving cavity are spaced by a partition wall, when the brushhead element is engaged with the handle, the partition wall is between the driving shaft and the end of the metal elastic member.

16. The brushhead according to claim 13, wherein the opening is in a slender strip shape, a first inner surface and a second inner surface of the opening are arranged opposite to each other, and the first inner surface is a long strip shape extending along the direction, and the second inner surface is arch shaped.

* * * * *